United States Patent
Lee et al.

(10) Patent No.: US 10,044,008 B2
(45) Date of Patent: Aug. 7, 2018

(54) RECHARGEABLE BATTERY

(71) Applicant: SAMSUNG SDI CO., LTD., Yongin-si, Gyeonggi-do (KR)

(72) Inventors: Jongha Lee, Yongin-si (KR); Junsun Yong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 195 days.

(21) Appl. No.: 14/825,045

(22) Filed: Aug. 12, 2015

(65) Prior Publication Data
US 2016/0049623 A1 Feb. 18, 2016

(30) Foreign Application Priority Data

Aug. 13, 2014 (KR) .................. 10-2014-0104861

(51) Int. Cl.
*H01M 2/04* (2006.01)
*H01M 2/02* (2006.01)

(52) U.S. Cl.
CPC ....... *H01M 2/0469* (2013.01); *H01M 2/0404* (2013.01); *H01M 2/0426* (2013.01); *H01M 2/0473* (2013.01); *H01M 2/0207* (2013.01); *H01M 2/0217* (2013.01)

(58) Field of Classification Search
CPC ............ H01M 2/0469; H01M 2/0404; H01M 2/0473; H01M 2/0426; H01M 2/0217; H01M 2/0207
See application file for complete search history.

(56) References Cited

U.S. PATENT DOCUMENTS

| 2006/0024573 A1 | 2/2006 | Yim et al. |
| 2014/0205896 A1 | 7/2014 | Kim |

FOREIGN PATENT DOCUMENTS

| CN | 201146203 Y | 11/2008 |
| EP | 2 166 594 A2 | 3/2010 |
| EP | 2 175 506 A2 | 4/2010 |
| EP | 2 824 729 A1 | 1/2015 |
| JP | 11-086809 | 3/1999 |
| KR | 10-0580777 B1 | 5/2006 |
| KR | 10-0601507 B1 | 7/2006 |
| KR | 10-0601538 B1 | 7/2006 |

OTHER PUBLICATIONS

EPO Search Report dated Jan. 18, 2016, for corresponding European Patent application 15180571.0, (7 pages).

(Continued)

*Primary Examiner* — Cynthia K Walls
(74) *Attorney, Agent, or Firm* — Lewis Roca Rothgerber Christie LLP

(57) ABSTRACT

According to aspects of embodiments of the present invention, a secondary battery includes: an electrode assembly including: a first electrode plate; a second electrode plate; and a separator between the first electrode plate and the second electrode plate; a can comprising an opening formed on an end of the can to accommodate the electrode assembly; and a cap plate configured to seal the opening of the can, the cap plate including: a first surface; a second surface parallel to the first surface; a third surface coupling the first and second surfaces and having a constant height; and a chamfer at a portion of the first surface which contacts the third surface, wherein the chamfer has a varying tilt.

11 Claims, 5 Drawing Sheets

(56) References Cited

OTHER PUBLICATIONS

English machine translation of Chinese Publication 201146203 dated Nov. 5, 2008, (4 pages).
English machine translation of Japanese Publication 11-086809 dated Mar. 30, 1999, (17 pages).
Korean Patent Abstracts Publication No. 10-2006-0027275 A, dated Mar. 27, 2006, for KR 10-0601507 B1, 1 page.
Korean Patent Abstracts Publication No. 10-2006-0013936 A, dated Feb. 14, 2006, for KR 10-0601538 B1, 1 page.

RECHARGEABLE BATTERY

CROSS-REFERENCE TO RELATED APPLICATION

This application claims priority to and the benefit of Korean Patent Application No. 10-2014-0104861, filed on Aug. 13, 2014, in the Korean Intellectual Property Office, the disclosure of which is incorporated herein in its entirety by reference.

BACKGROUND

1. Field

One or more example embodiments of the present invention relate to a secondary battery.

2. Description of the Related Art

Unlike a primary battery that cannot be recharged, a secondary battery can be repeatedly charged and discharged and has been widely used in small-sized advanced electronic devices such as mobile phones, personal digital assistants (PDAs), and laptop computers.

As secondary batteries have become more commonly used in various fields, it has become important to secure the reliability of secondary batteries according to the environment in which secondary batteries is used. For example, secondary batteries may be sealed from an outside environment in order to secure the reliability of the secondary battery. If the secondary battery is not completely sealed, problems such as electrolyte leakage may occur when the secondary battery is fallen or is damaged due to a strong external impact. Thus, the secondary battery may not operate properly.

SUMMARY

One or more example embodiments of the present invention include a secondary battery that may be relatively easily sealed from an outside or external environment.

Additional aspects will be set forth in part in the description which follows and, in part, will be apparent from the description, or may be learned by practice of the presented example embodiments.

According to aspects of embodiments of the present invention, a secondary battery includes: an electrode assembly including: a first electrode plate; a second electrode plate; and a separator between the first electrode plate and the second electrode plate; a can comprising an opening formed on an end of the can to accommodate the electrode assembly; and a cap plate configured to seal the opening of the can, the cap plate including: a first surface; a second surface parallel to the first surface; a third surface coupling the first and second surfaces and having a constant height; and a chamfer at a portion of the first surface which contacts the third surface, wherein the chamfer has a varying tilt.

The first surface of the cap plate may face an inside of the can, and the second surface of the cap plate may face an outside of the can.

The cap plate may extend in a lengthwise direction, and the chamfer may include: a first chamfer formed on a first edge in the lengthwise direction of the cap plate; and a second chamfer formed on a second edge in a width direction of the cap plate, wherein a tilt of the first chamfer is greater than a tilt of the second chamfer.

The tilt of the first chamfer may be variable, and the tilt of the second chamfer may be constant.

The first edge of the cap plate may be curved, and a portion of the first edge closest to an outside of the cap plate may have a greatest tilt among edges of the first chamfer.

The tilt of the first chamfer may gradually increase from a part coupled to the second chamfer to the portion of the first edge closest to the outside of the cap plate.

A height of the first chamfer may be less than or equal to 70% of a height of the third surface of the cap plate.

A length of the first chamfer may be greater than a length of the second chamfer.

The first edge of the cap plate may be curved, and a portion of the first edge closest to an outside of the cap plate may have a greatest length among edges of the first chamfer.

The length of the first chamfer may gradually increase from a part coupled to the second chamfer to the portion of the first edge closest to the outside of the cap plate.

According to aspects of embodiments of the present invention, a secondary battery includes: a can including an opening formed on one end of the can; an electrode assembly in the can, wherein the opening of the can is configured to accommodate the electrode assembly; and a cap plate having a constant thickness and configured to seal the opening of the can, wherein the cap plate comprises a chamfer formed on an edge of the cap plate and located inside the can, wherein the chamfer has a tilt which increases toward a portion of a round-shaped end of the cap plate closest to an outside of the cap plate.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Figure 1:
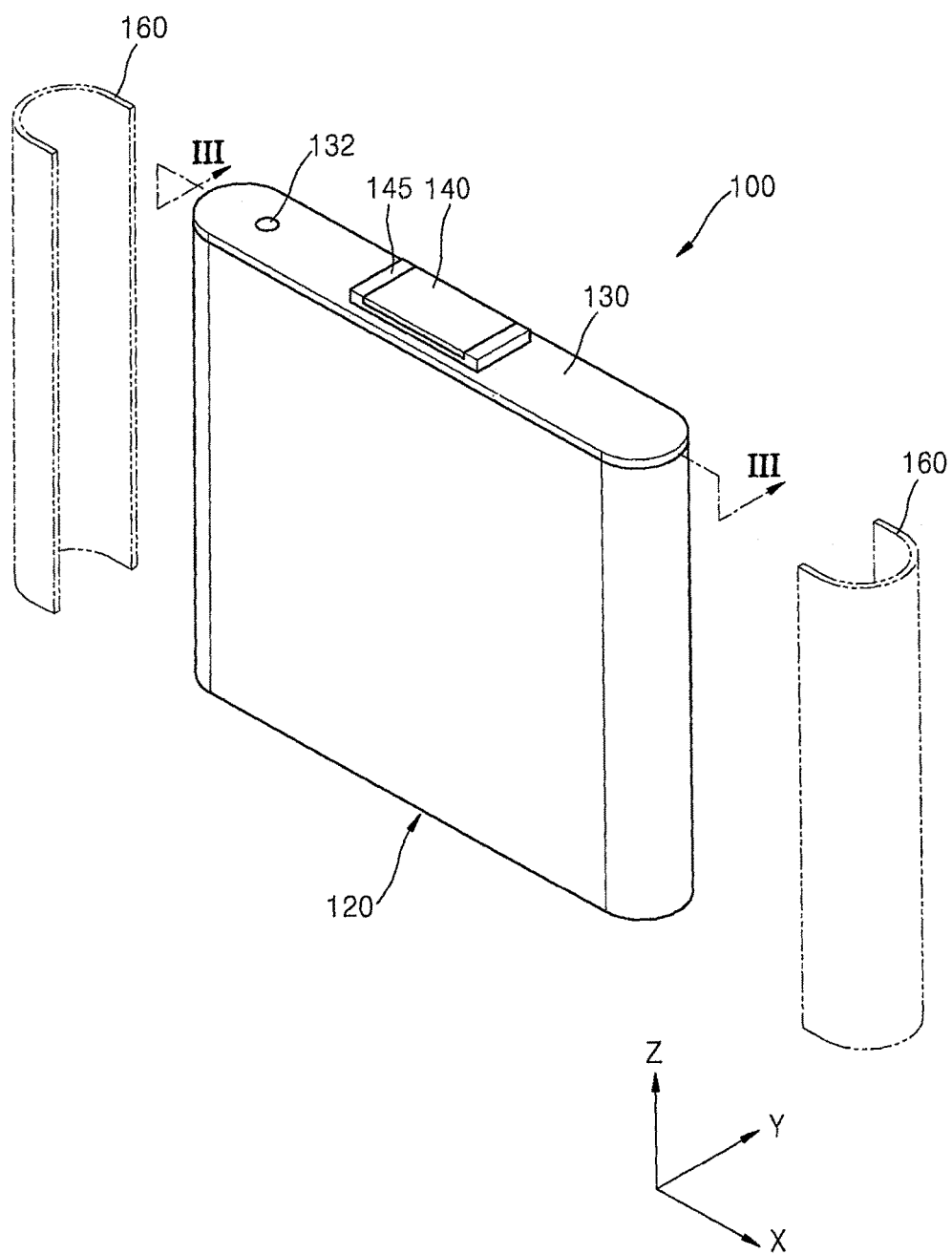
FIG. 1 is a schematic perspective view of a secondary battery according to an example embodiment of the present invention.

As the invention allows for various changes and numerous example embodiments, particular example embodiments will be illustrated in the drawings and described in some detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of the related art are omitted when it is deemed that they may unnecessarily obscure the characteristics of the invention.

Hereinafter, the present invention will be described in some detail by explaining example embodiments of the invention with reference to the attached drawings. Like reference numerals in the drawings denote like elements, and repeated descriptions thereof will be omitted.

It will be understood that although the terms "first", "second", etc. may be used herein to describe various components, these components should not be limited by these terms. These components are only used to distinguish one component from another.

As used herein, the singular forms "a", "an", and "the" are intended to include the plural forms as well, unless the context clearly indicates otherwise.

As the invention allows for various changes and numerous example embodiments, particular example embodiments will be illustrated in the drawings and described in more detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of the related art are omitted when it is deemed that they may unnecessarily obscure the characteristics of the invention.

Hereinafter, aspects of embodiments of the present invention will be described in some detail by explaining example embodiments of the invention with reference to the attached drawings.

It will be further understood that the terms "comprises" and/or "comprising" used herein specify the presence of stated features or components, but do not preclude the presence or addition of one or more other features or components.

It will be understood that when a layer, region, or component is referred to as being "formed on" another layer, region, or component, it can be directly or indirectly formed on the other layer, region, or component. That is, for example, intervening layers, regions, or components may be present.

In the following examples, the x-axis, the y-axis, and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

Sizes of components in the drawings may be exaggerated for convenience of explanation. In other words, because sizes and thicknesses of components in the drawings are arbitrarily illustrated for convenience of explanation, the following example embodiments are not limited thereto.

Figure 2:
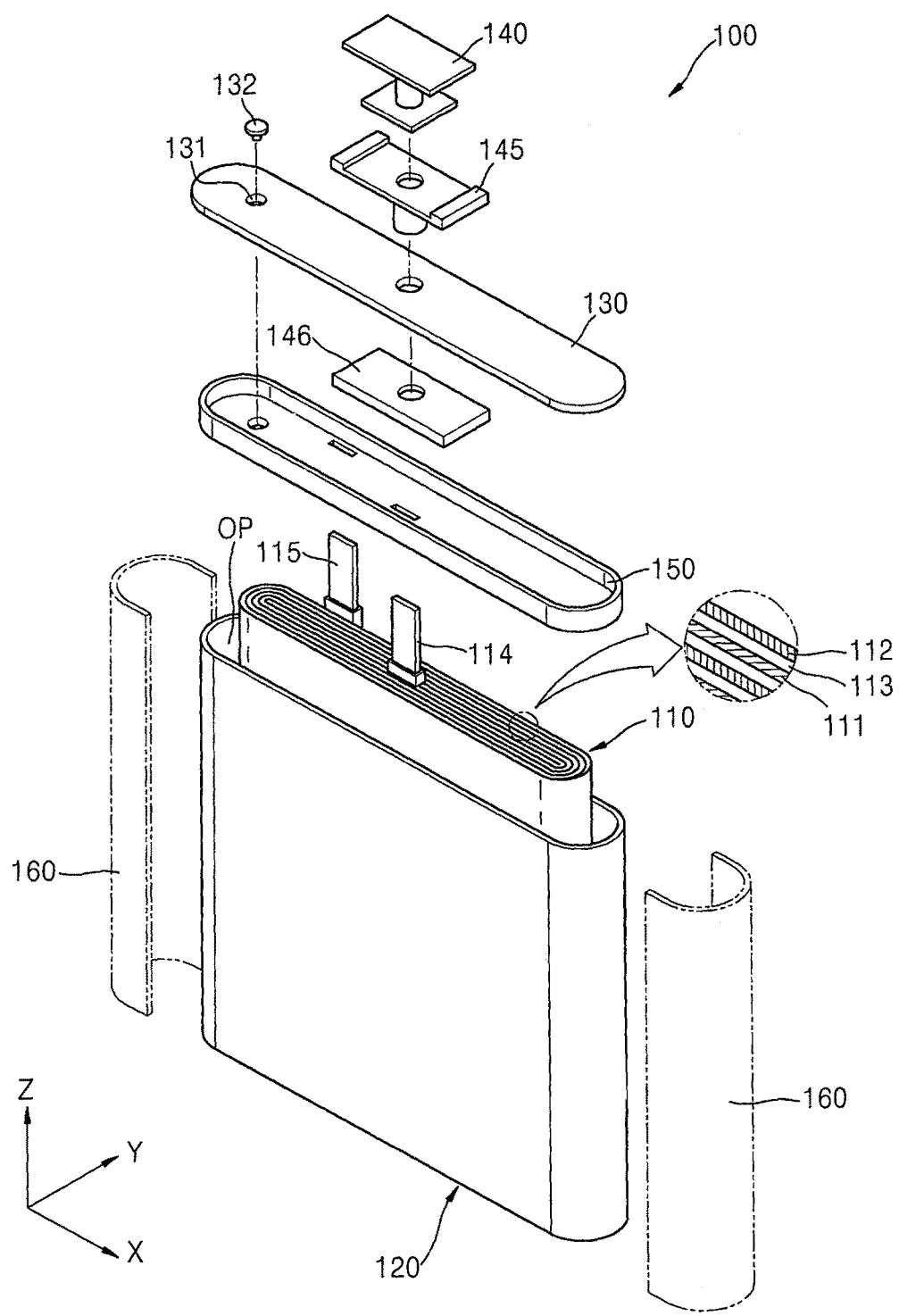
FIG. 2 is an exploded perspective view of the secondary battery of FIG. 1.
Figure 3:
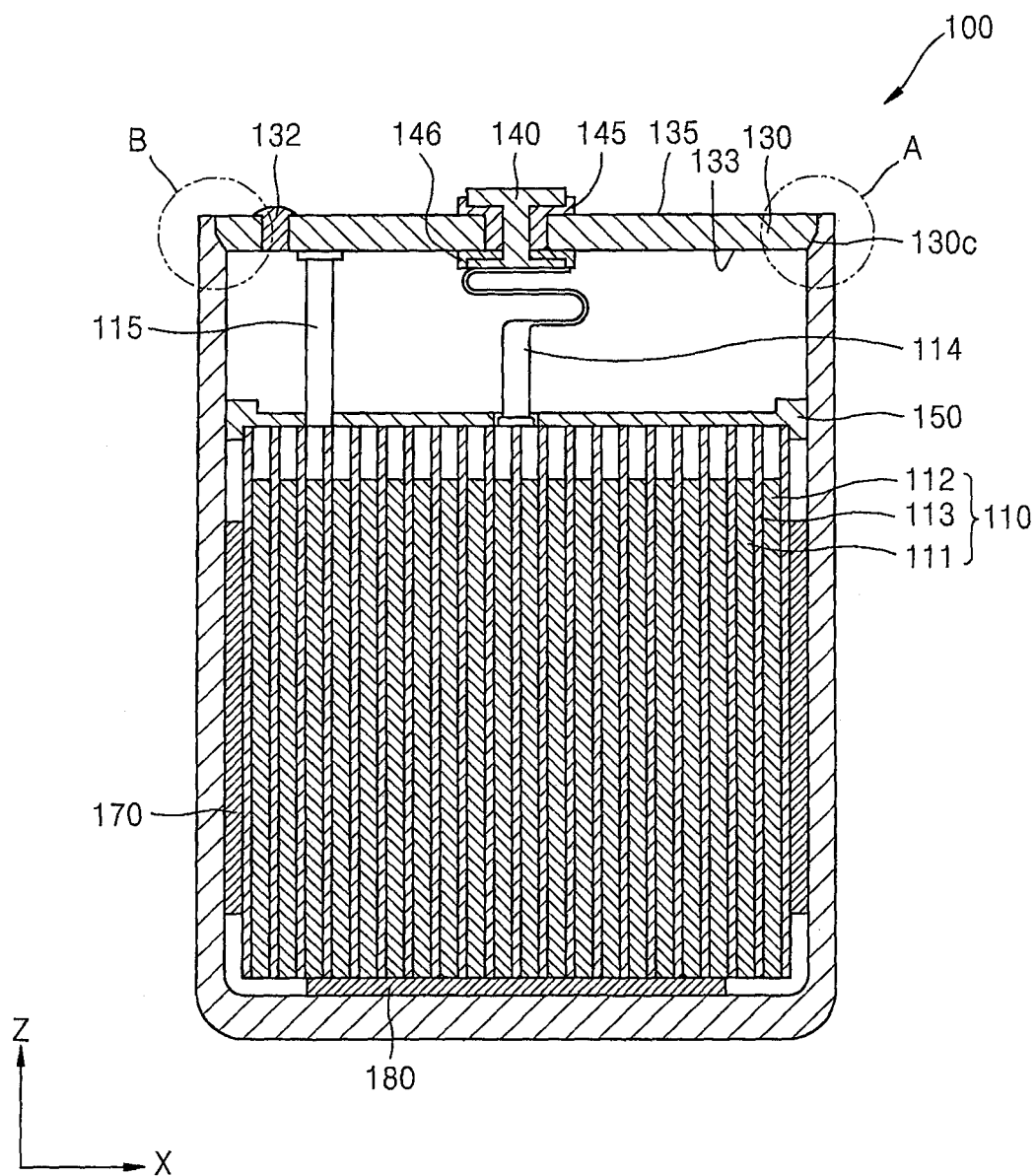
FIG. 3 is a cross-sectional view taken along a line III-III of FIG. 1.

FIG. 1 is a schematic perspective view of a secondary battery 100 according to an example embodiment of the present invention, and FIG. 2 is an exploded perspective view of the secondary battery 100 of FIG. 1. FIG. 3 is a cross-sectional view taken along a line III-III of FIG. 1.

Referring to FIGS. 1 through 3, the secondary battery 100 may include an electrode assembly 110, a can (or housing) 120 housing the electrode assembly 110, and a cap plate 130 sealing an inside of the can 120.

The electrode assembly 110 may include a first electrode plate 111 and a second electrode plate 112 on which electrode active materials are respectively spread or deposited, and a separator 113 positioned between the first and second electrode plates 111 and 112. The electrode assembly 110 has a stack structure in which the first electrode plate 111, the second electrode plate 112, and the separator 113 are sequentially stacked, and then may be wrapped to form a jelly-roll structure. The first and second electrode plates 111 and 112 are respectively electrically coupled to a first electrode tab 114 and a second electrode tab 115 for discharging charges which are generated due to chemical reactions. The first electrode tab 114 and the second electrode tab 115 may extend in the same direction. For example, the first electrode tab 114 and the second electrode tab 115 may extend toward an opening OP of the can 120.

The first electrode plate 111 may include a first metal collector (and a first active material portion that is formed after a first active material is spread or deposited on a surface of the first metal collector. Likewise, the second electrode plate 112 may include a second metal collector and a second active material portion that is formed after a second active material is spread or deposited on a surface of the second metal collector.

The first electrode plate 111 is formed of a positive electrode film, and the first metal collector is a positive electrode collector. The first active material portion may be a positive active material portion. Also, the second electrode plate 112 is formed of a negative electrode film, and the second metal collector is a negative electrode collector. The second active material portion may be a negative active material portion. Materials and structures of the positive electrode collector, the positive active material portion, the negative electrode collector, and the negative active material portion may include well-known materials that are used in ordinary primary batteries, and thus detailed descriptions regarding the materials and structures may be omitted.

The separator 113 may be a porous polymer film such as a polyethlene film or a polypropylene film and may be formed of non-woven fabrics or woven fabrics including polymer fibers. In addition, the separator 113 may include ceramic particles and may be formed of polymer solid electrolytes. The separator 113 may be formed as a separate film or may be used after a non-conductive porous layer is formed on the first electrode plate 111 and the second electrode plate 112.

The separator 113 may be used to electrically separate the first electrode plate 111 and the second electrode plate 112, and a shape of the separator 113 may not be the same as the first electrode plate 111 and the second electrode plate 112.

In the present example embodiment, the electrode assembly 110 has a jelly-roll shape, but the present invention is not limited thereto. As another example embodiment, the electrode assembly 110 may have a stack structure in which the first electrode plate 111, the second electrode plate 112, and the separator 113 located therebetween are stacked.

The can 120 may be hexahedron shaped and have an opening at one end, that is, at an end corresponding to an upper surface of the can 120. The can 120 may be formed of a metallic material to obtain rigidity. For example, the can 120 may be formed of aluminum (Al), or an Al alloy. The electrode assembly 110, which is immersed in an electrolyte, may be housed inside the can 120. In this case, surrounded by an insulating seat 170, the electrode assembly 110 may be housed inside the can 120 in order to prevent (or reduce instances of) an undesired short between the electrode assembly 110 and the can 120 which is formed of a metallic material. After the electrode assembly 110 is housed inside the can 120, the opening OP may be sealed by the cap plate 130. A portion of the can 120 which contacts the cap plate 130 is coupled thereto by laser welding, and thus the inside of the can 120 may be airtight.

The cap plate 130 may include an electrolyte injection hole 131. After the cap plate 130 is coupled to the can 120, the electrolyte may be injected through the electrolyte injection hole 131, and the electrolyte injection hole 131 may be sealed by a cap 132. As another example, the cap plate 130 may not include the electrolyte injection hole 131. In this regard, the electrolyte may be injected before the can 120 and the cap plate 130 are coupled to each other by laser welding.

An electrode pin 140 may be positioned on the cap plate 130. An upper portion of the electrode pin 140 is exposed to the outside through an upper surface of the cap plate 130, and a lower portion of the electrode pin 140 may penetrate the cap plate 130 and may face the inside of the can 120.

The cap plate 130 may be positioned on an upper surface of the can 120 in order to seal the opening OP of the can 120. The cap plate 130 may be formed of a metallic material such as Al or an Al alloy which is the same as that used to form the can 120. As shown in FIG. 3, the electrode pin 140 is electrically coupled to the first electrode tab 114 of the electrode assembly 110 and may have a first polarity. The cap plate 130 is electrically coupled to the second electrode tab 115 of the electrode assembly 110 and may have a second polarity. The can 120 which is coupled to the cap plate 130 by welding may also have the second polarity.

For example, the cap plate 130 may function as a positive electrode of the secondary battery 100, and the electrode pin 140 may function as a negative electrode thereof. In this case, a first gasket 145 and a second gasket 146, which include a suitable insulative (or insulating) materials to prevent (or reduce instances of) shorts between the cap plate 130 and the electrode pin 140, may be arranged between the cap plate 130 and the electrode pin 140. The first gasket 145 is positioned to contact the upper surface of the cap plate 130, and the second gasket 146 may be positioned to contact the lower surface of the cap plate 130. In FIG. 2, the first and second gaskets 145 and 146 are separate, but the first and second gaskets 145 and 146 may be formed as a single component. Insulating films 160 which cover sides of the can 120 may be attached to electrically insulate the can 120, which has the second polarity and is coupled to the cap plate 130 by welding, from an external product or anther secondary battery.

A first insulating member 150 positioned on an upper surface of the electrode assembly 110 may be located inside the can 120. The first insulating member 150 may insulate the electrode assembly 110 from the cap plate 130. As another example, the first insulating member 150 insulates the electrode assembly 110 from the cap plate 130 and may control the movement of the electrode assembly 110 in the can 120. The first insulating member 150 includes through holes which the first and second electrode tabs 114 and 115 may pass through, and may include a hole formed at a location corresponding to the electrolyte injection hole 131 so that an electrolyte may be injected into the electrolyte injection hole 131. A second insulating member 180 is located on a lower surface of the electrode assembly 110 and may prevent (or reduce instances of) an undesired short between the can 120 formed of a metallic material and the electrode assembly 110.

Referring to FIG. 3, the cap plate 130 may be positioned on the upper surface of the can 120 in order to seal the opening OP of the can 120 and may be formed of metallic materials such as Al or an Al alloy which is the same as that used to form the can 120. The opening OP of the can 120 may be sealed with the cap plate 130 by using various methods. In the present specification, an interference fit design is described, but the present invention is not limited thereto.

When a size of an inside diameter of the can 120 is A, a size of the cap plate 130 may be A+α. The opening OP of the can 120 may be sealed by inserting the cap plate 130 onto the inside of the can 120. In this case, stress is applied to an end A of the cap plate 130, which extends in a lengthwise direction (an X-axis direction), and thus the cap plate 130 formed of a metallic material may be curved or bent, thereby causing the secondary battery 100 to malfunction. Therefore, with regard to the interference fit design of the secondary battery 100, a structure of the cap plate 130 which eases stress concentration at an end of the cap plate 130 and increases sealing force of the cap plate 130 is suggested.

As shown in FIG. 3, the cap plate 130 extends in the lengthwise direction (the X-axis direction) and may include a first surface 133, a second surface 135 parallel to the first surface 133, and a third surface coupling the first and second surfaces 133 and 135 and having a constant height T. That is, the cap plate 130 has a thickness corresponding to the height T of the third surface 137. In this case, the first surface 133 is arranged to face the inside of the can 120, and the second surface 135 may be arranged to face the inside of the can 120. A chamfer 130c may be formed at a portion of the first surface 133 which contacts the third surface 137. The tilt of the chamfer 130c may be variable.

Hereinafter, the chamfer 130c formed on an edge of the cap plate 130 will be described in more detail.

Figure 4:
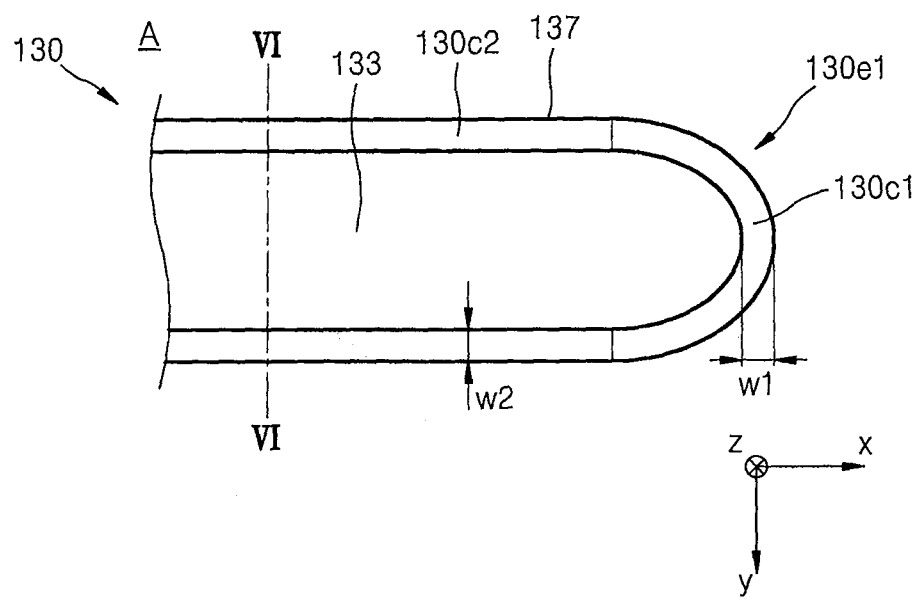
FIG. 4 is a bottom view of an area A of FIG. 3.
Figure 5:
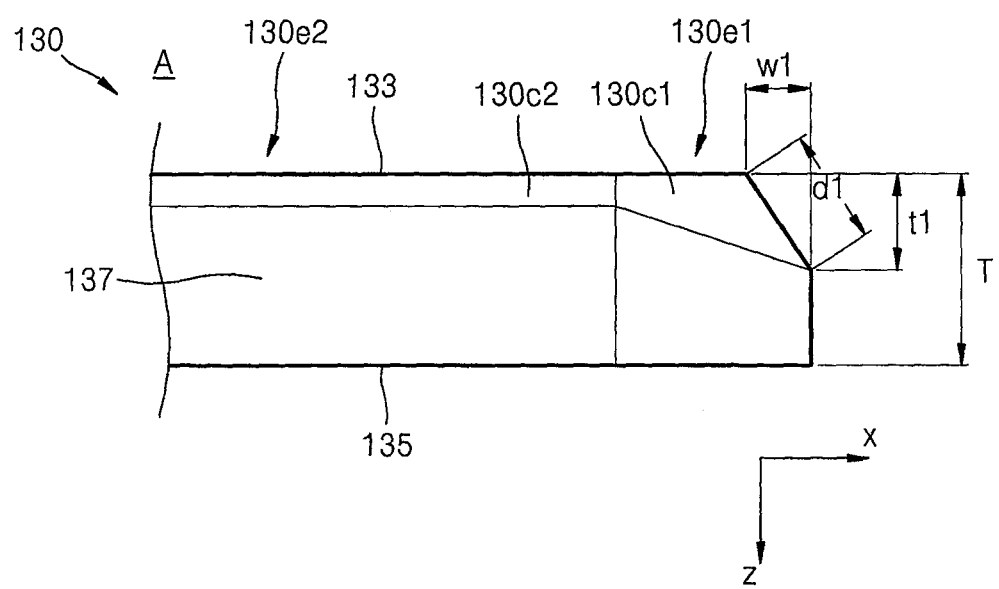
FIG. 5 is a schematic side view of FIG. 4.
Figure 6:
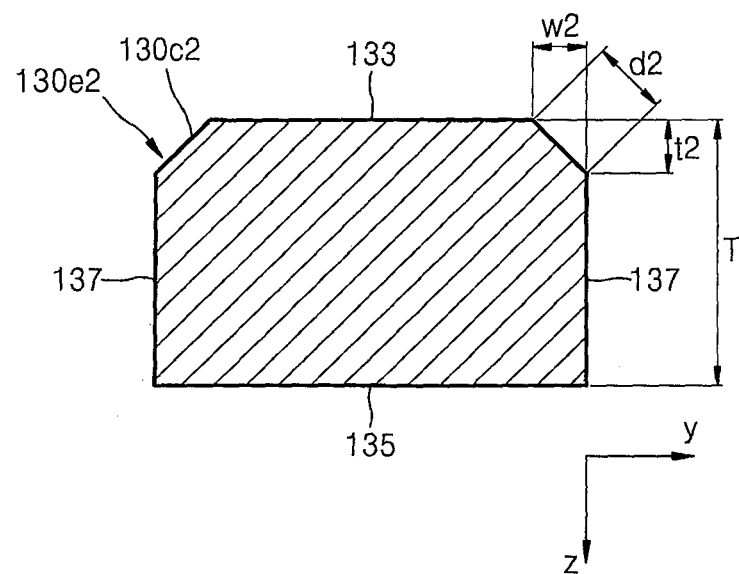
FIG. 6 is a cross-sectional view taken along a line VI-VI of FIG. 4.

FIG. 4 is a bottom view of an area A of FIG. 3, and FIG. 5 is a schematic side view of FIG. 4. FIG. 6 is a cross-sectional view taken along a line VI-VI of FIG. 4.

FIGS. 4 through 6 show the end A of the cap plate 130, and a detailed description of the end A is provided. Descriptions about the other end B of the cap plate 130 that is not shown in FIGS. 4 through 6 will be the same as the descriptions about the end A.

Referring to FIGS. 4 through 6, the cap plate 130 may include the first surface 133, the second surface 135 parallel to the first surface 133, and the third surface coupling the first and second surfaces 133 and 135 and having a constant height T. FIG. 4 shows the first surface 133 of the cap plate 130, and the first surface 133 faces the inside of the can 120. As described above, the chamfer 130c is formed at the portion of the first surface 133 which contacts the third surface 137, and the tilt of the chamfer 130c may be variable.

The cap plate 130 has a first edge 130e1 in the lengthwise direction (the X-axis direction) and a second edge 130e2 in a width direction of the cap plate 130. A first chamfer 130c1 is located on the first edge 130e1, and a second chamfer 130c2 is located on the second edge 130e2. In this case, a tilt of the first chamfer 130c1 is different from that of the second chamfer 130c2. That is, the tilt of the first chamfer 130c1 is greater than that of the second chamfer 130c2.

The tilt of the first chamfer 130c1 is variable, and a portion of the first edge 130e1 which is furthest toward the outside of the cap plate 130 has the largest tilt among edge of the first chamfer 130c1. That is, the tilt gradually increases from a portion of the first chamfer 130c1, which is coupled to the second chamfer 130c2, to the portion of the first edge 130e1 which is furthest toward the outside of the cap plate 130. The maximum amount of stress occurs at the portion of the cap plate 130 which is furthest toward the outside the cap plate 130. Therefore, the tilt is designed to gradually increase and a rapid taper is formed on the portion of the cap plate 130 so as to minimize the amount of stress applied to the cap plate 130.

On the other hand, the tilt of the second chamfer 130c2 is constant along the second edge 130e2 of the cap plate 130. Therefore, a height t2 and a width w2 of the second chamfer 130c2 are always the same.

FIG. 5 shows the tilt of the first chamfer 130c1 at the portion of the first edge 130e1 of the cap plate 130, which is furthest toward the outside of the cap plate 130. The tilt of the first chamfer 130c1 at the portion of the first edge 130e1 of the cap plate 130, which is furthest toward the outside of the cap plate 130, is equal to a height t1 of the first chamfer 130c1 divided by a width w1 of the first chamfer 130c1. The height t1 of the first chamfer 130c1 is greater than the width w1 of the first chamfer 130c1. At a location where the tilt of the first chamfer 130c1 is the greatest, a ratio of the width w1 of the first chamfer 130c1 to the height t1 of the first chamfer 130c1 may be 1:2. If the width w1 of the first chamfer 130c1 is about 0.2 mm, the height t1 of the first chamfer 130c1 may be 0.4 mm.

Referring to FIG. 6, the tilt of the second chamfer 130c2 is equal to the height t2 of the second chamfer 130c2 divided by the width w2 of the second chamfer 130c2. The height t2 of the second chamfer 130c2 is roughly the same as the width w2 of the second chamfer 130c2. That is, a ratio of the height t1 of the first chamfer 130c1 to the width w1 of the first chamfer 130c1 is about 1:1. If the width w1 of the first chamfer 130c1 is about 0.2 mm, the height t1 of the first chamfer 130c1 is about 0.2 mm. Therefore, a tilt of a portion of the first chamfer 130c1, which is the greatest among tilts of portions of the first chamfer 130c1, may be two times greater than the tilt of the second chamfer 130c2.

The cap plate 130 has the first edge 130e1 of the lengthwise direction (the X-axis direction) of the cap plate 130 and the second edge 130e2 of the width direction (the Y-axis direction) of the cap plate 130). The first chamfer 130c1 is located on the first edge 130e1, and the second chamfer 130c2 is located on the second edge 130e2. In this case, as shown in FIG. 4, the width w1 of the first chamfer 130c1 in the X-axis direction is the same as the width w2 of the second chamfer 130c2 in the Y-axis direction. The width w1 of the first chamfer 130c1 and the width w2 of the second chamfer 130c2 may be about 0.2 mm.

The cap plate 130 has a thickness corresponding to the height T of the third surface 137, and as shown in FIG. 5, the height t1 of the first chamfer 130c1 may be less than or equal to 70% of the height T of the cap plate 130 based on the portion of the first chamfer 130c1 having the greatest tilt. If the height t1 of the first chamfer 130c1 is equal to or greater than 70% of the height T of the cap plate 130, the strength of the cap plate 130 which supports an inner wall of the can 120 is weakened, and defects may occur when the can 120 is coupled to the cap plate 130 by welding.

Referring to FIGS. 5 and 6, because the tilt of the first chamfer 130c1 is different from that of the second chamfer 130c2, a length d1 of the first chamfer 130c1 may be different from a length d2 of the second chamfer 130c2. The length d1 of the first chamfer 130c1 may be greater than the length d2 of the second chamfer 130c2. The length of the first chamfer 130c1 may be the greatest at a portion of the first edge 130e1 which is furthest toward the outside of the cap plate 130. the first chamfer 130c1 gradually increases in length from a portion on which the first chamfer 130c1 is coupled to the second chamfer 130c2 to the portion of the first edge 130e1, which is furthest toward the outside of the cap plate 130, and the length of the first chamfer 130c1 may be the greatest at a portion of the first edge 130e1 which is furthest toward the outside of the cap plate 130.

The gradual increase in the length of the first chamfer 130c1 may minimize an amount of stress applied to the cap plate 130 because a rapid taper is formed at a portion of the cap plate 130, which is furthest toward the outside of the cap plate 130, because the maximum amount of stress inside the can 120 occurs at the portion of the cap plate 130.

Through the above design of the cap plate 130, shape superimposition between the can 120 and the cap plate 130 may be improved by minimizing bending deformation of the cap plate 130 and forming a variable chamfer on a portion of the cap plate 130 without changing materials of the cap plate 130. As a result, a secondary battery having a greatly improved characteristics or depth may be embodied.

As described above, according to the one or more of the above example embodiments of the present invention, a secondary battery that may endure external impact and internal swelling may be embodied. However, the scope of the present invention is not limited thereto. The characteristics of the present invention may be derived from the descriptions that are provided above with reference to the attached drawings.

It should be understood that the example embodiments described therein should be considered in a descriptive sense only and not for purposes of limitation. Descriptions of features or aspects within each example embodiment should typically be considered as available for other similar features or aspects in other example embodiments.

While one or more example embodiments of the present invention have been described with reference to the figures, it will be understood by those of ordinary skill in the art that various changes in form and details may be made therein without departing from the spirit and scope of the present invention as defined by the following claims, and their equivalents.

What is claimed is:
1. A secondary battery comprising:
an electrode assembly comprising:
a first electrode plate;
a second electrode plate; and
a separator between the first electrode plate and the second electrode plate;
a can comprising an opening formed on an end of the can to accommodate the electrode assembly; and
a cap plate configured to seal the opening of the can, the cap plate comprising:
a first surface;
a second surface parallel to the first surface;
a third surface coupling the first and second surfaces and having a constant height; and
a chamfer at a portion of the first surface which contacts the third surface, wherein a slope of the chamfer changes along the third surface.
2. The secondary battery of claim 1, wherein the first surface of the cap plate faces an inside of the can, and
the second surface of the cap plate faces an outside of the can.
3. The secondary battery of claim 2, wherein the cap plate extends in a lengthwise direction, and
the chamfer comprises:
a first chamfer formed on a first edge in the lengthwise direction of the cap plate; and
a second chamfer formed on a second edge in a width direction of the cap plate,
wherein a tilt of the first chamfer is greater than a tilt of the second chamfer.
4. The secondary battery of claim 3, wherein the tilt of the first chamfer is variable, and the tilt of the second chamfer is constant.
5. The secondary battery of claim 4, wherein the first edge of the cap plate is curved, and a portion of the first edge closest to an outside of the cap plate has a greatest tilt among edges of the first chamfer.
6. The secondary battery of claim 5, wherein the tilt of the first chamfer gradually increases from a part coupled to the second chamfer to the portion of the first edge closest to the outside of the cap plate.

7. The secondary battery of claim 6, wherein a height of the first chamfer is less than or equal to 70% of a height of the third surface of the cap plate.

8. The secondary battery of claim 3, wherein a length of the first chamfer is greater than a length of the second chamfer.

9. The secondary battery of claim 8, wherein the first edge of the cap plate is curved, and
   a portion of the first edge closest to an outside of the cap plate has a greatest length among edges of the first chamfer.

10. The secondary battery of claim 9, wherein the length of the first chamfer gradually increases from a part coupled to the second chamfer to the portion of the first edge closest to the outside of the cap plate.

11. A secondary battery comprising:
    a can comprising an opening formed on one end of the can;
    an electrode assembly in the can, wherein the opening of the can is configured to accommodate the electrode assembly; and
    a cap plate having a constant thickness and configured to seal the opening of the can, wherein the cap plate comprises a chamfer formed on an edge of the cap plate and located inside the can,
    wherein the chamfer has a tilt which increases toward a portion of a round-shaped end of the cap plate closest to an outside of the cap plate.

* * * * *